(12) United States Patent
Lee et al.

(10) Patent No.: US 7,832,046 B2
(45) Date of Patent: Nov. 16, 2010

(54) COUPLING APPARATUS OF WIPER ARM

(75) Inventors: In-ho Lee, Daejeon (KR); Yeong-ki Min, Cheonan-si (KR); Sung-wook Jeon, Cheongwon-gun (KR); Nam-young Suk, Cheongju-si (KR); Weiler Michael, Daejeon (KR); Philip Claeskens, Daejeon (KR)

(73) Assignee: Korea Automotive Motor Corporation (KR)

( * ) Notice: Subject to any disclaimer, the term of this patent is extended or adjusted under 35 U.S.C. 154(b) by 265 days.

(21) Appl. No.: 11/571,927

(22) PCT Filed: Oct. 26, 2006

(86) PCT No.: PCT/KR2006/004393

§ 371 (c)(1),
(2), (4) Date: Jan. 10, 2007

(87) PCT Pub. No.: WO2007/049923

PCT Pub. Date: May 3, 2007

(65) Prior Publication Data

US 2009/0165236 A1    Jul. 2, 2009

(30) Foreign Application Priority Data

Oct. 27, 2005   (KR)  ............... 10-2005-0101950

(51) Int. Cl.
*B60S 1/40* (2006.01)
(52) U.S. Cl. .................. 15/250.32; 15/250.351; 15/250.44
(58) Field of Classification Search ............. 15/250.32, 15/250.44, 250.43, 250.351
See application file for complete search history.

(56) References Cited

U.S. PATENT DOCUMENTS 3,576,044 A  *  4/1971  Besnard ............... 15/250.32

(Continued)

FOREIGN PATENT DOCUMENTS

FR      2838693     * 10/2003

(Continued)

OTHER PUBLICATIONS

PCT International Search Report for International Application No. PCT/KR2006/004393; Date of Mailing of the International Search Report: Dec. 22, 2006.

(Continued)

*Primary Examiner*—Gary K Graham
(74) *Attorney, Agent, or Firm*—Cantor Colburn LLP

(57) ABSTRACT

Disclosed herein is a coupling apparatus for a wiper arm, which can provide firm coupling between a wiper blade and the wiper arm. The coupling apparatus comprises a blade coupling part provided to the wiper blade and including front and rear plates and having an opening defined at upper portions of the front and rear plates and a support shaft having a rectilinear plane formed at either side of the support shaft, and a wiper arm coupling part integrally formed at one end with the wiper arm and including a slant insertion mechanism to cause the wiper arm to be slantly inserted onto the support shaft and to hold the support shaft so as not to be separated from the slant insertion mechanism by changing an inclination of the wiper arm after the wiper arm is inserted onto the support shaft.

2 Claims, 7 Drawing Sheets

U.S. PATENT DOCUMENTS 4,348,782 A * 9/1982 Fournier .................. 15/250.32
4,445,249 A * 5/1984 Harbison et al. ......... 15/250.32

FOREIGN PATENT DOCUMENTS

| JP | 2000-355270 | 12/2000 |
|---|---|---|
| JP | 2001-008046 | 1/2001 |
| JP | 2001-063531 | 3/2001 |
| JP | 2001080469 | 3/2001 |
| JP | 2005-007505 | 1/2005 |

OTHER PUBLICATIONS

PCT Written Opinion of the International Searching Authority for International Application N.: PCT/KR2006/004393; Date of Mailing: Dec. 22, 2006.

* cited by examiner

PRIOR ART

PRIOR ART

COUPLING APPARATUS OF WIPER ARM

BACKGROUND OF THE INVENTION

1. Field of the Invention

The present invention relates to a wiper, and more particularly to a coupling apparatus for a wiper arm, which ensures firm coupling between the wiper arm and a wiper blade.

2. Description of the Related Art

In general, wipers are installed on an outer glass surface of a front windshield or a rear window of a vehicle to remove rainwater or foreign substances attached to the glass surface for the purpose of securing view of a driver when it rains or snows.

FIG. 6 is a cross-sectional view showing a conventional coupling apparatus for a wiper arm, and FIG. 7 is an enlarged view of part 7 in FIG. 6.

A typical wiper comprises a wiper arm 100 rotated by a motor in a vehicle and including a coupling part 101 integrally formed with one end of the wiper arm 100, and a wiper blade 200 coupled to the wiper arm 100 to wipe a glass surface of the vehicle through reciprocation on the glass surface.

Specifically, the coupling part 101 of the wiper arm 100 has a coupling groove 102 open at a lower portion, and a resilient piece 103 formed at either side of the coupling groove 102 to allow easy insertion of the coupling part 101.

In addition, the wiper blade 200 is formed at the center thereof with an opening 201 open at upper and lower portions, and comprises a support shaft 202 positioned at the center of the opening to allow insertion of the coupling groove 102 onto the support shaft 202.

Thus, when inserting the coupling groove 102 of the coupling part 101 onto the support shaft 202, the resilient piece 103 having flexibility is flexed such that the coupling groove 102 can be easily inserted onto the support shaft 202.

When the wiper blade is operated by the driver due to difficulty in maintenance of the driver's view by rain, snow, dust, etc. while driving on a road, the wiper arm is rotated by the motor installed in the vehicle. Then, the wiper blade is also rotated by the wiper arm while being in contact with the glass window such that moisture or dust on the glass window can be removed at every rotation of the wiper blade, thereby securing the view of the driver for safety.

However, the conventional wiper with the configuration as described above has a problem in that, as the wiper blade is repetitiously attached to and detached from the wiper arm for replacement due to abrasion on a rubber part of the wiper blade, the resilient piece provided at either side of the coupling part of the wiper arm is deformed to become loose so that coupling force between the wiper arm and the wiper blade is deteriorated.

SUMMARY OF THE INVENTION

Therefore, the present invention has been made in view of the above problems, and it is an object of the present invention to provide a coupling apparatus for a wiper arm, which can ensure firm coupling between the wiper arm and a wiper blade through insertion and rotation of a support shaft of the wiper blade into a slanted groove of the wiper arm.

It is another object of the present invention to provide the coupling apparatus for the wiper arm, which can prevent separation of the wiper arm by means of front and rear protrusions which are inserted into arcuate grooves.

In accordance with an aspect of the present invention, the above and other objects can be accomplished by the provision of a coupling apparatus for coupling a wiper arm to a wiper blade, comprising: a blade coupling part provided to the wiper blade, and including front and rear plates with an opening defined at upper portions of the front and rear plates, and a support shaft formed between the front and rear plates; and a wiper arm coupling part integrally formed with one end of the wiper arm, and including a slant insertion mechanism to cause the wiper arm to be slantly inserted onto the support shaft and to hold the support shaft so as not to be separated from the slant insertion mechanism by changing an inclination of the wiper arm after the wiper arm is inserted onto the support shaft, the slant insertion mechanism including a longitudinally slanted groove open at a lower portion and having opposite oblique surfaces, each being formed to be slanted from a lower portion of one side to an upper portion of the other side, and an arcuate surface connecting the opposite oblique surfaces with each other so as to be brought into close contact with an outer surface of the support shaft, wherein the support shaft has a rectilinear surface formed at either side of the support shaft, wherein each oblique surface of the slant insertion mechanism has a jaw inwardly protruding from a central region of the oblique surface and having a curved surface at an end of the jaw toward the arcuate surface of the slanted groove such that an arcuate end formed at either side of the rectilinear surface of the support shaft is latched to a corresponding jaw, wherein the front and rear plates have front and rear protrusions respectively formed on inner surfaces at the other side so as to be positioned on an imaginary arc centered on the support shaft, and wherein the wiper arm coupling part has arcuate grooves respectively formed in front and rear surfaces of the wiper arm coupling part so as to be positioned on an imaginary arc centered on the arcuate surface of the slanted groove such that the front and rear protrusions are inserted into the arcuate grooves, respectively.

In accordance with another aspect of the present invention, each of the rectilinear surfaces is partially formed on the central region of the support shaft, and each of the jaws has a length corresponding to a length of the rectilinear surface in a transverse direction.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Exemplary embodiments of the present invention will be described with reference to the accompanying drawings.

Figure 1:
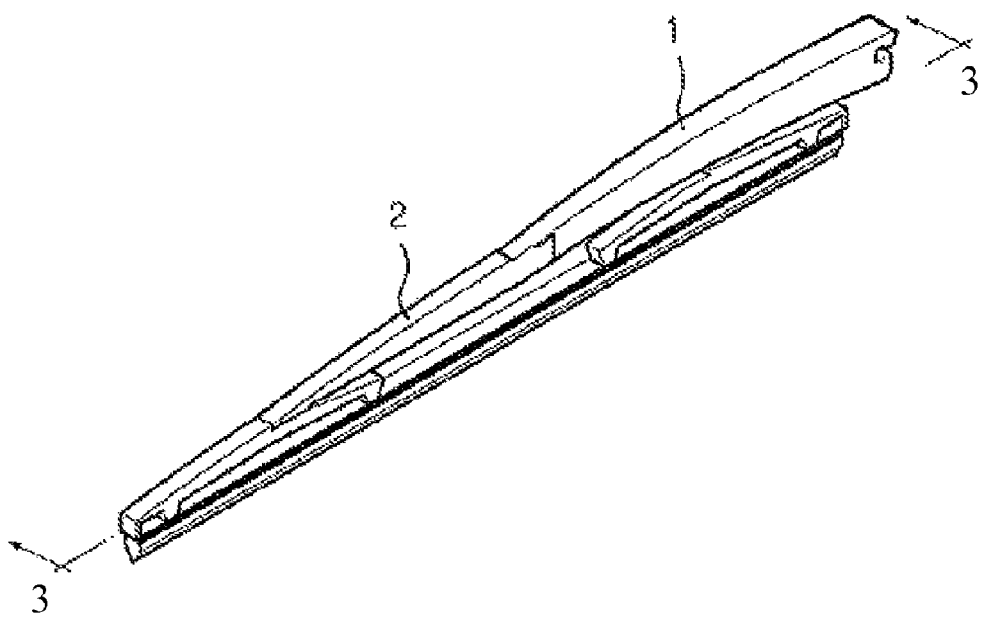
FIG. 1 is a perspective view showing a coupled state of a coupling apparatus for a wiper arm according to one embodiment of the present invention.
Figure 2:
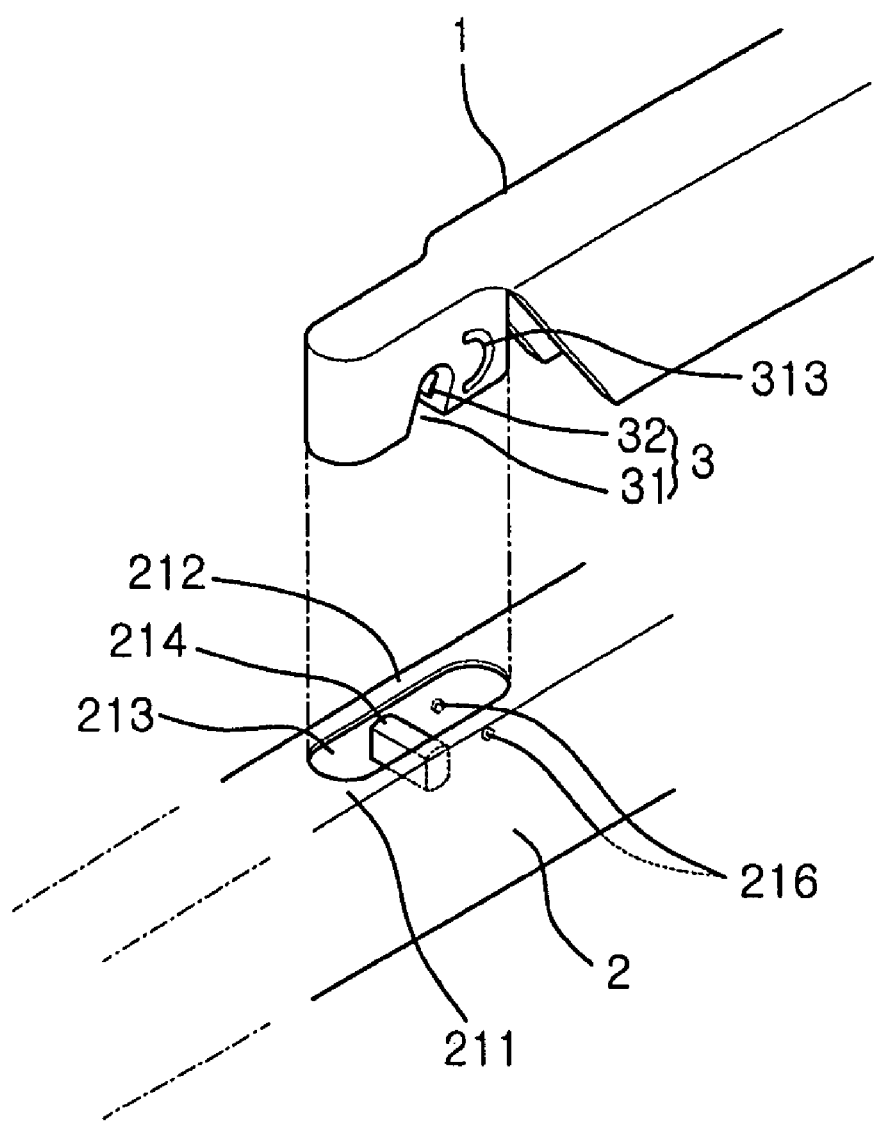
FIG. 2 is an exploded perspective view showing the coupling apparatus for the wiper arm according to the present invention.
Figure 3:
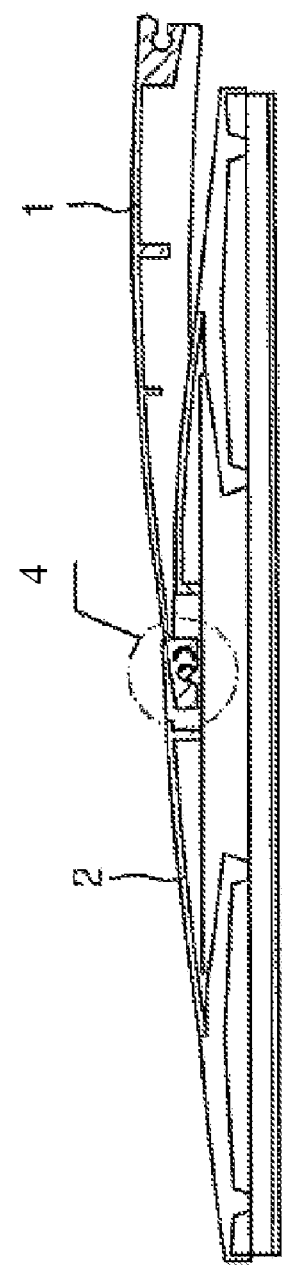
FIG. 3 is a cross-sectional view taken along line 3-3 of FIG. 1.
Figure 4:
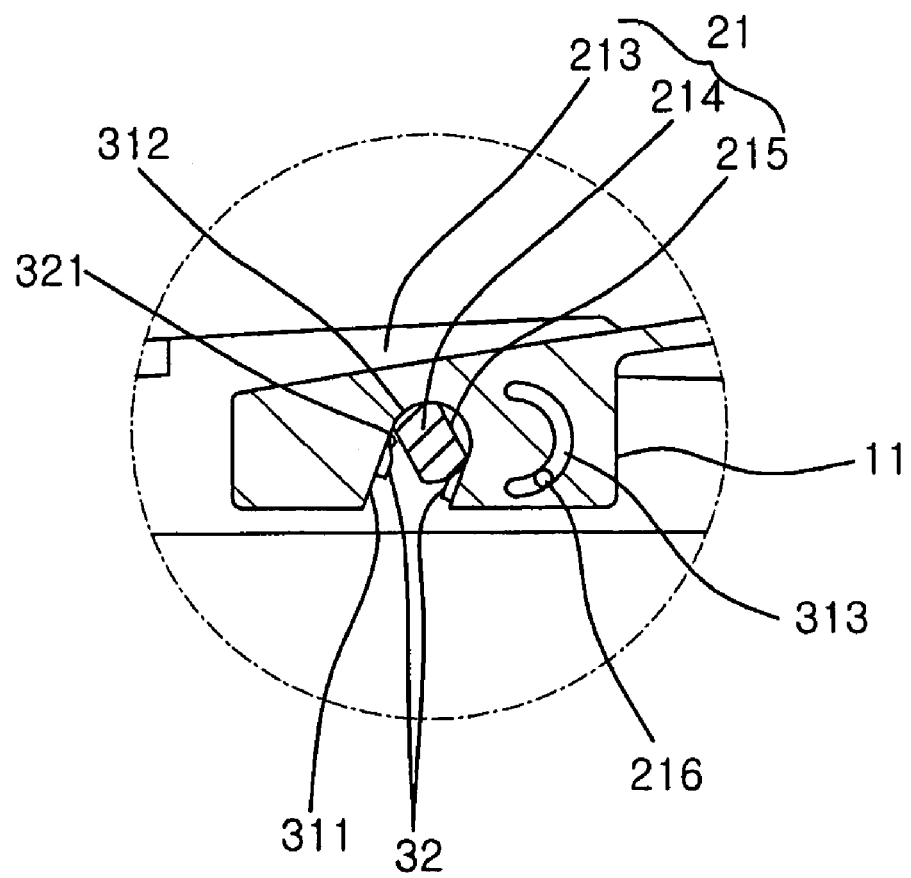
FIG. 4 is an enlarged view of part 4 in FIG. 3.

FIG. 1 is a perspective view showing a coupled state of a coupling apparatus for a wiper arm according to one embodiment of the present invention, FIG. 2 is an exploded perspective view showing the coupling apparatus for the wiper arm according to the present invention, FIG. 3 is a cross-sectional view taken along line 3-3 of FIG. 1, and FIG. 4 is an enlarged view of part 4 in FIG. 3.

The present invention relates to a coupling apparatus for coupling a wiper arm 1 to a wiper blade 2. The coupling apparatus of the present invention comprises: a blade coupling part 21 provided to the wiper blade 2, and including front and rear plates 211 and 212 with an opening 213 defined at upper portions of the front and rear plates 211 and 212, and a support shaft 214 positioned between the front and rear plates 211 and 212 and having a rectilinear plane 215 formed at either side of the support shaft 214; and a wiper arm coupling part 11 integrally formed at one end with the wiper arm 1 and including a slant insertion mechanism 3 to cause the wiper arm 1 to be slantly inserted onto the support shaft 214 and to hold the support shaft 214 so as not to be separated from the slant insertion mechanism 3 by changing an inclination of the wiper arm 1 after the wiper arm 1 is inserted onto the support shaft 214.

In particular, the slant insertion mechanism 3 is formed with a longitudinally slanted groove 31, which is open at a lower portion and has opposite oblique surfaces 311, each being formed to be slanted from a lower portion of one side to an upper portion of the other side, and an arcuate surface 312 connecting the opposite oblique surfaces 311 with each other and being brought into close contact with an outer surface of the support shaft 214, and with opposite jaws 32, each of which inwardly protrudes from a central region of the oblique surface 311 to support the support shaft 214 such that, after both rectilinear surfaces 215 of the support shaft 214 pass through the jaws 32 by oblique insertion of the wiper arm 1, a lower surface of the wiper arm 1 is obliquely supported by a portion of the jaw 32 at the other side.

Among the opposite jaws 32, an upper surface of the jaw 32 positioned at the other side is constituted by a curved surface 321 which has the same center as that of the arcuate surface 312 of the slanted groove 31.

As such, since the lower surface of the support shaft 214 is brought into close contact with the curved surface 321 of the jaw 32 at the other side by inclining the wiper arm 1, the support shaft 214 is not only supported by the jaws 32, but also prevented from being separated from the slanted groove 31 thereby to the outside.

Furthermore, the front and rear plates 211 and 212 have front and rear protrusions 216 respectively formed on inner surfaces at the other side thereof so as to be positioned on an imaginary arc centered on the support shaft 214. That is, the support shaft 214, and the front and rear protrusions 216 are provided inside the front and rear plates 211 and 212.

In addition, the wiper arm coupling part 11 has arcuate grooves 313 respectively formed in front and rear surfaces thereof while being centered on the curved surface 321 of the slanted groove 31, such that the front and rear protrusions 216 are inserted into the arcuate grooves 313, respectively.

With this configuration, the wiper can be stably operated without separation by engaging the front and rear protrusions 216 with the arcuate grooves 313 after inserting the slanted groove 31 onto the support shaft 214 of the wiper blade 2.

The rectilinear surface 215 is formed on the overall region at either side of the support shaft 214, and each of the jaws 32 has a length corresponding to the length of the slanted groove 31 in the transverse direction. With this configuration, since a space is defined between the rectilinear surface 215 at either side of the support shaft 214 and the curved surface 321, there can be lateral movement of the wiper. To prevent this movement, the rectilinear surface 215 may be formed only on a central region at either side of the support shaft 214 according to another embodiment described as follows.

Operation of the coupling apparatus for the wiper according to the present invention will hereinafter be described.

As shown in FIGS. 2 to 4, for application of the coupling apparatus for the wiper according to the invention, the slanted groove 31 of the wiper arm 1 is first inserted onto the support shaft 214 of the wiper blade 2.

Here, the rectilinear surfaces 215 of the support shaft 214 are easily fitted between the opposite jaws 32 formed on the inner surfaces of the slanted groove 31.

In other words, when the wiper arm 1 is inclined through coupling the wiper arm coupling part 11 between the support shaft 214, an upper portion of the support shaft 214 is brought into close contact with the arcuate surface 312 of the slanted groove 31, and a lower portion of the support shaft 214 is brought into close contact with the curved surface 321 of the jaw 32 at the other side.

Thus, the wiper arm 1 is firmly supported on the wiper blade 2 by bringing the upper and lower portions of the support shaft 214 into contact with the arcuate surface 312 of the slanted groove 31 and the curved surface 321 of the jaw 32 at the other side, respectively.

Then, the front and rear protrusions of the blade coupling part 21 are inserted into the arcuate grooves 313 of the wiper arm coupling part 11, respectively.

Therefore, the front and rear protrusions of the blade coupling part 21 are guided along the arcuate grooves 313 upon operation of the wiper so that the wiper can be stably operated without separation.

Figure 5:
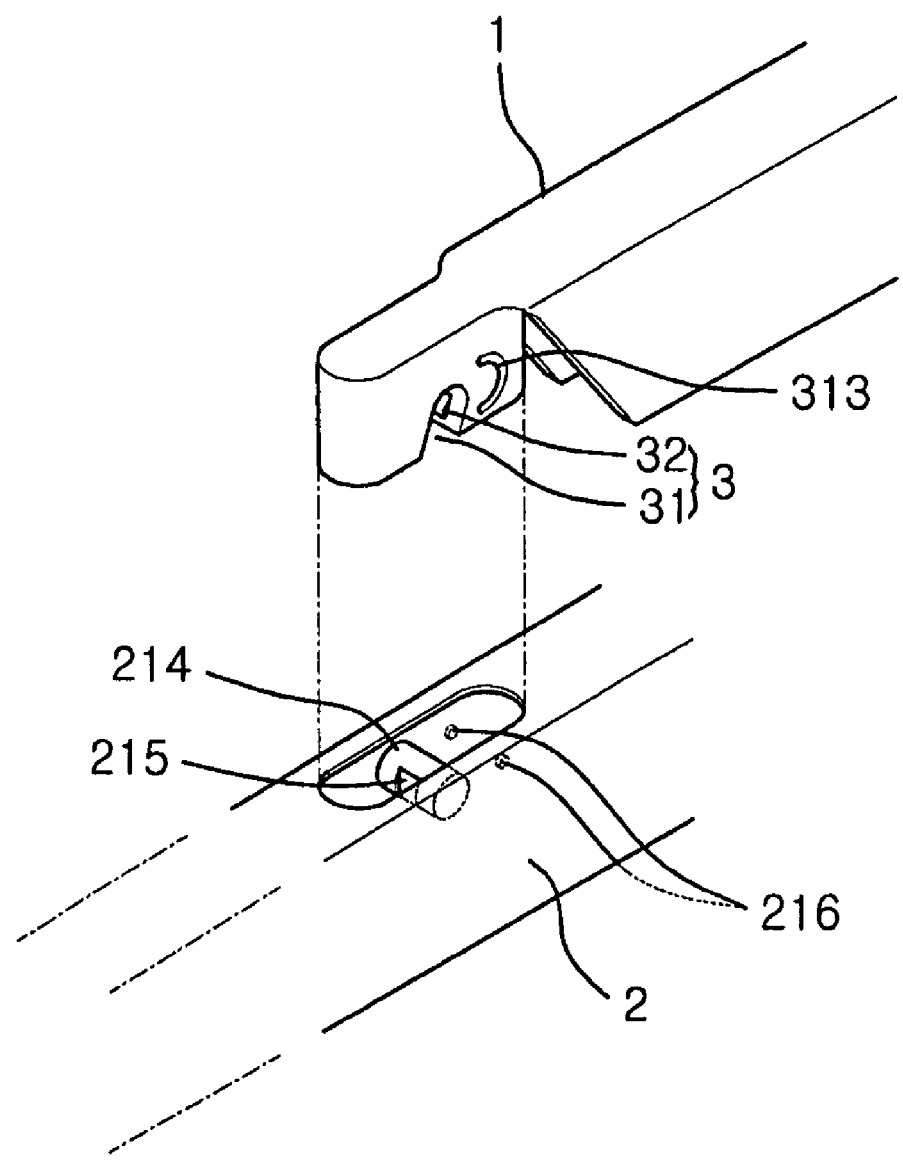
FIG. 5 is a perspective view of a coupling apparatus for a wiper arm according to another embodiment of the present invention.
Figure 6:
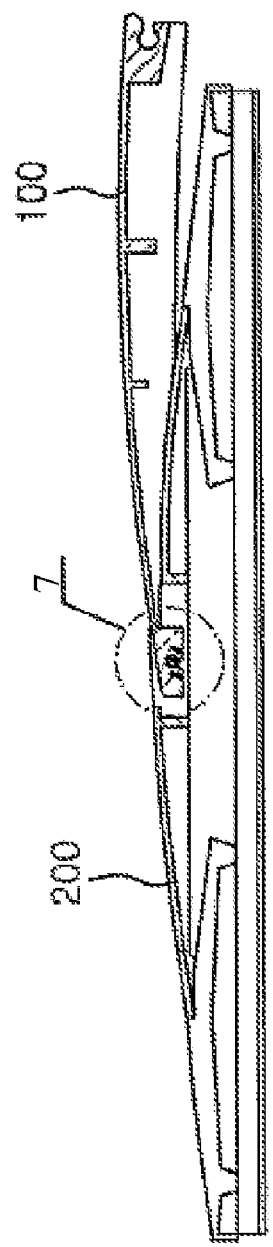
FIG. 6 is a cross-sectional view showing a coupling apparatus for a conventional wiper arm.
Figure 7:
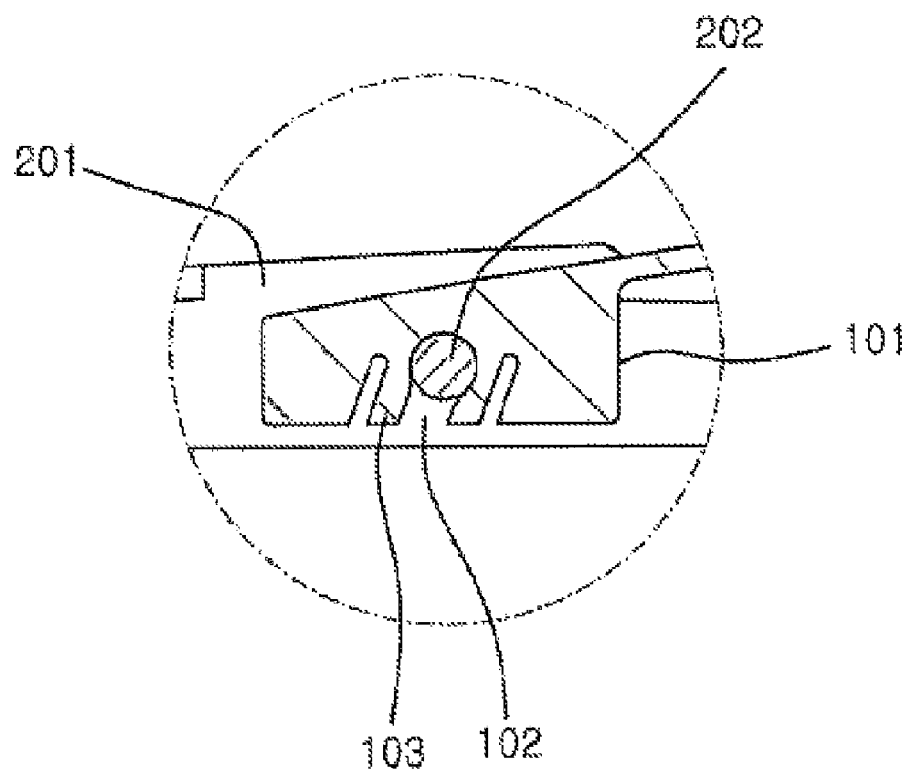
FIG. 7 is an enlarged view of part 7 in FIG. 6.

FIG. 5 is a perspective view of a coupling apparatus for a wiper arm according to another embodiment of the present invention.

The coupling apparatus according to the other embodiment has the same configuration as that of the aforementioned embodiment except for the configuration of a support shaft which will be described as follows.

The support shaft 214 of this embodiment comprises a rectilinear surface 215 formed at either side on the central region of the support shaft 214, and opposite jaws 32 formed to have a length corresponding to the length of the rectilinear surface of the support shaft 214 in the transverse direction.

As such, the support shaft 214 has the rectilinear surface 215 formed only on the central region thereof and opposite circular ends so that the support. shaft 214 can be easily inserted into the slanted groove 31 until it reaches the arcuate surface 312. Additionally, with this configuration, after the support shaft 214 reaches the slanted groove 31 through the slanted groove 31, it is not only prevented from being separated from the arcuate surface 312, but also supported in the slanted groove 31 with both circular ends of the support shaft 214 abutted by the arcuate surface 312, thereby preventing the lateral movement which can occur in the aforementioned embodiment.

Thus, more preferably, the support shaft 214 has the rectilinear surface 215 formed only on the central region at either side of the support shaft 214 rather than being formed on the overall region, so that it is possible to improve support strength of the support shaft 214 with respect to the wiper arm 1. Additionally, the rectilinear surface 215 of the support shaft 214 has the length corresponding to that of the jaw 32 in the transverse direction so that the support shaft 214 can be easily inserted into the slanted groove 31, and prevented from being laterally moved inside the arcuate surface 312 of the slanted groove.

INDUSTRIAL APPLICABILITY

As apparent from the above description, the coupling apparatus for the wiper arm according to the present invention, provides an advantageous effect in that the wiper arm is firmly coupled to the wiper blade through insertion and inclination of the support shaft of the wiper blade into the slanted groove of the wiper arm.

In addition, the coupling apparatus for the wiper arm according to the present invention provides another advantageous effect in that the front and rear protrusions are inserted into the arcuate grooves to prevent separation of the wiper arm, thereby ensuring stable operation of the wiper.

What is claimed is:

1. A coupling apparatus coupling a wiper arm to a wiper blade, the coupling apparatus comprising:
   a blade coupling part provided to the wiper blade, and including front and rear plates with an opening defined at upper portions of the front and rear plates, and a support shaft positioned between the front and rear plates; and
   a wiper arm coupling part integrally formed with one end of the wiper arm, and including a slant insertion mechanism to cause the wiper arm to be slantly inserted onto the support shaft and to hold the support shaft so as not to be separated from the slant insertion mechanism by changing an inclination of the wiper arm after the wiper arm is inserted onto the support shaft, the slant insertion mechanism including a longitudinally slanted groove open at a lower portion of the wiper arm coupling part and having opposite oblique surfaces extending with respect to a bottom surface thereof, each being formed to be slanted from the lower portion of one side to an upper portion of another side of the coupling part, and an arcuate surface connecting the opposite oblique surfaces with each other so as to be brought into close contact with an outer surface of the support shaft,
   wherein the support shaft has a rectilinear surface formed on opposite sides of the support shaft,
   wherein each oblique surface of the slant insertion mechanism has a jaw inwardly protruding from a central region of the oblique surface and having a curved surface at an end of the jaw toward the arcuate surface of the slanted groove such that an arcuate end formed at either side of the rectilinear surface of the support shaft is latched to a corresponding jaw,
   wherein the front and rear plates have front and rear protrusions respectively formed on inner surfaces thereof so as to be positioned on an imaginary arc centered on the support shaft, and
   wherein the wiper arm coupling part has arcuate grooves respectively formed in front and rear surfaces of the wiper arm coupling part so as to be positioned on an imaginary arc centered on the arcuate surface of the slanted groove such that the front and rear protrusions are inserted into the arcuate grooves, respectively.

2. The coupling apparatus according to in claim 1, wherein each of the rectilinear surfaces is partially formed on a central region of the support shaft, and each of the jaws has a length corresponding to a length of the rectilinear surface in a transverse direction.

* * * * *